(12) United States Patent
Kulkarni

(10) Patent No.: US 8,982,757 B2
(45) Date of Patent: Mar. 17, 2015

(54) NONLINEAR POWER STATE TRANSITIONING

(71) Applicant: Cisco Technology, Inc., San Jose, CA (US)

(72) Inventor: Ajay Kulkarni, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 191 days.

(21) Appl. No.: 13/787,947

(22) Filed: Mar. 7, 2013

(65) Prior Publication Data
US 2014/0254369 A1 Sep. 11, 2014

(51) Int. Cl.
| G06F 1/00 | (2006.01) |
| G06F 1/26 | (2006.01) |
| G06F 1/32 | (2006.01) |
| H04L 12/12 | (2006.01) |
| G08C 17/00 | (2006.01) |

(52) U.S. Cl.
CPC .......... *H04L 12/12* (2013.01); *G06F 1/32* (2013.01); *G06F 1/3203* (2013.01)
USPC ............ 370/311; 713/300; 713/320; 713/323

(58) Field of Classification Search
CPC ........ G06F 1/32; G06F 1/3203; G06F 1/3204
USPC ............................ 370/311; 713/300, 320, 323
See application file for complete search history.

(56) References Cited

U.S. PATENT DOCUMENTS

| 5,805,910 A * | 9/1998 | Lee et al. ................. 713/323 |
| 5,974,552 A * | 10/1999 | Lim et al. ................. 713/300 |
| 2004/0078117 A1* | 4/2004 | Vanderah et al. ............ 700/301 |
| 2005/0067198 A1* | 3/2005 | LeBlanc et al. ................. 178/3 |
| 2005/0088313 A1* | 4/2005 | LeBlanc et al. .......... 340/825.24 |
| 2013/0007473 A1* | 1/2013 | van der Lee ................. 713/300 |
| 2014/0164803 A1* | 6/2014 | Huynh et al. ................. 713/323 |

OTHER PUBLICATIONS

Ranganathan, "Recipe for Efficiency: Principles of Power-Aware Computing," Communications of the ACM, vol. 53, No. 4, Apr. 2010, pp. 60-67.

Kulkarni, et al., "IDC: An Energy Efficient Communication Scheme for Connected Mobile Platforms," Proceedings of the 2009 IEEE International Conference on Communications, Jun. 14-18, 2009, pp. 1-6.

(Continued)

*Primary Examiner* — Farah Faroul
(74) *Attorney, Agent, or Firm* — Edell, Shapiro & Finnan, LLC

(57) ABSTRACT

In nonlinear power state transitioning, temporal intervals of inactivity in network traffic traversing a network node are determined from transport control data carried in the network traffic. An interrupt is generated that compels a deepest diminished power state from a plurality of power states in the network node. The deepest diminished power state is the deepest power state from which recovery to a completely powered state within a minimum one of the inactivity intervals is assured. Electrical energy consumption in the network node is reduced in response to the interrupt in accordance with a power management schedule.

22 Claims, 6 Drawing Sheets

(56) References Cited

OTHER PUBLICATIONS

Huang, et al., "Improving Energy Efficiency by Making DRAM Less Randomly Accessed," Proceedings of the 2005 International Symposium on Low Power Electronics and Design, Aug. 8-10, 2005, pp. 1-6.

Hayenga, et al., "Accurate System-Level Performance Modeling and Workload Characterization for Mobile Internet Devices," Proceedings of the 9th workshop on Memory Performance: Dealing with Applications, Systems and Architecture, Oct. 26-26, 2008, pp. 54-60.

Min, et al., "Improving Energy Efficiency for Mobile Platforms by Exploiting Low-power Sleep States," Proceedings of the 9th Conference on Computing Frontiers, May 15-17, 2012, pp. 133-142.

Ryu, et al., "Exploiting Fine-Grained Idle Periods in Networks of Workstations," IEEE Transactions on Parallel and Distributed Systems, vol. 11, No. 7, Jul. 2000, pp. 683-698.

Alizadeh, et al., "Data Center TCP (DCTCP)," SIGCOMM'10, Aug. 30-Sep. 3, 2010, pp. 63-74.

Bang, et al., "Run-Time Adaptive Workload Estimation for Dynamic Voltage Scaling," IEEE Transactions on Computer-Aided Design of Integrated Circuits and Systems, vol. 28, No. 9, Sep. 2009, pp. 1334-1347.

Verma, et al., "Server Workload Analysis for Power Minimization using Consolidation," Proceedings of the 2009 Conference on USENIX Annual Technical Conference, Jun. 14-19, 2009, pp. 1-14.

\* cited by examiner

NONLINEAR POWER STATE TRANSITIONING

TECHNICAL FIELD

The present disclosure relates to power management in communication network equipment.

BACKGROUND

Current trends in so called "green" computing have been of increasing interest in power management for various computing contexts, particularly in large, concentrated installations such as data centers. Indeed, energy consumption in data centers has recently come under scrutiny of the Environmental Protection Agency, which, in 2007, cited data centers as consuming approximately 1.5 percent of total U.S. electrical energy consumption at a cost of roughly $4.5 billion. Accordingly, continuing efforts are being made to reduce energy consumption wherever possible, including by power management at the chip level on equipment installed in data centers.

A power state, as used herein, is an operational state of a system in which electrical energy is consumed at a rate that is at or below a corresponding threshold. A diminished power state can be set by limiting system operation, such as by selectively powering down circuitry, and by suspending or even terminating executing processes. In many cases, a power state is defined by the manner in which energy consumption is reduced, i.e., by the circuits that are powered down, the processes that are terminated, the contents that are retained in memory, etc.

Power states typically transition in a sequence from a shallowest state in which a small number of systems are suspended, to a deepest state where all system processes have been terminated to the greatest extent possible while still allowing the system to be restarted without a fresh reboot. Deeper diminished power states conserve more energy than do shallower states, but the system requires a greater amount of time to recover to its fully operational state. Conventional wisdom has the power states transitioning based on system disuse, whereby as the system remains inactive for longer periods of time, it is transitioned into sequentially deeper diminished power states.

DESCRIPTION OF EXAMPLE EMBODIMENTS

Overview

In nonlinear power state transitioning, temporal intervals of inactivity in network traffic traversing a network node are determined from transport control data carried in the network traffic. An interrupt is generated that compels a deepest diminished power state from a plurality of power states in the network node. The deepest diminished power state is the deepest power state from which recovery to a completely power state within a minimum one of the inactivity intervals is assured. Electrical energy consumption in the network node is reduced in response to the interrupt in accordance with a power management schedule.

Example Embodiments

The technique described herein controls the consumption of electrical energy by network node equipment based on network traffic characteristics that are already measured and/or computed during the course of controlling the flow of traffic through the node. The traffic characteristics that are utilized identify periods of inactivity, i.e., intervals over which network traffic is not expected to traverse the node. The intervals of inactivity can be mapped to a power state that maximally reduces the energy consumption in the network node, such as by powering down circuits or suspending executing processes, but that also allows recovery of the network node to a fully operational state in time to process incoming network traffic upon its arrival after the period of inactivity.

Figure 1:
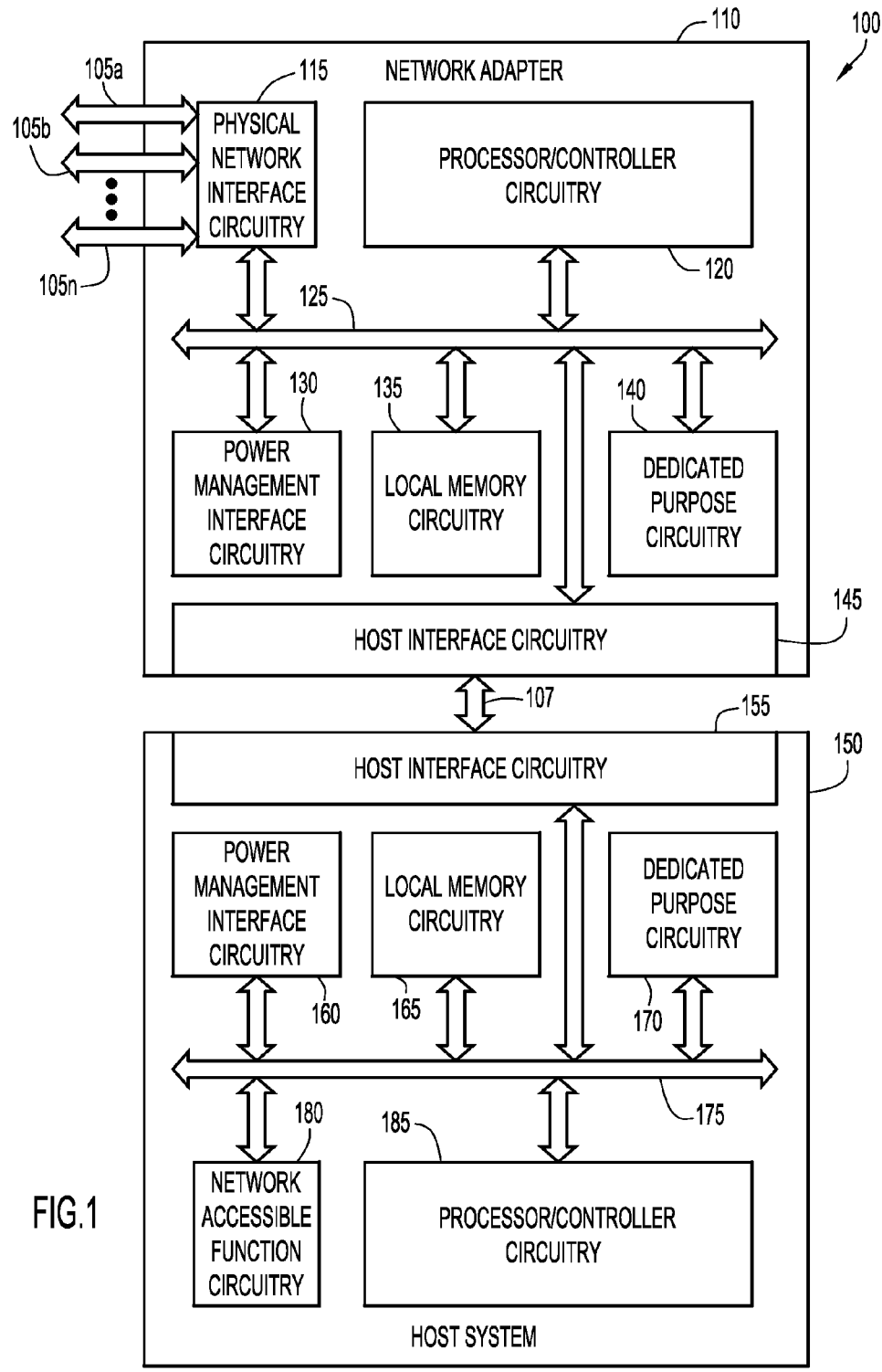
FIG. 1 is a schematic block diagram of a network node on which the technique disclosed herein may be implemented.

FIG. 1 is a schematic block diagram of a network node 100 attached to a network (not illustrated) to send, receive and forward information over communications channels formed in the network. The disclosed technique can be applied to a variety of network nodes, including, but not limited to computer workstations, network servers, gateways, network routers, network hubs, packet switches, wireless access points and audio/visual communication devices, in a variety of network configurations and media including, but not limited to, wired and wireless media access, optical and electrical signaling, wide area networks (WANs), local area networks (LANs), storage area networks (SANs) and cellular networks. The technique can be used in conjunction with a variety of protocols under which the information is conveyed from source to destination.

Network node 100 may be constructed from a network adapter 110 and a host system 150 interconnected one to the other by a data and control bus 107. However, it is to be understood that such electrical subdivision is not necessary to the technique; the division of network node 100 into adapter and host roles merely affords an example architecture through which the overall diversity of embodiments can be demonstrated. For example, as will be discussed further below, power states in the network adapter 110 and host system 150 may be controlled separately by control functions on each component, but embodiments of the disclosed technique may allow control of power states in both components in response to traffic characteristics measured in network adapter 110.

Host system 150 may be a data processing apparatus, a storage apparatus, a communication apparatus, etc.; it may operate directly on information-bearing data which it is provided, or may simply forward information data in accordance with traffic control parameters associated with the information-bearing data and/or in which the information-bearing data is encapsulated. As it pertains to the technique disclosed herein, there are no limitations on the end functionality of host system 150. Generically, host system 150 includes processor/controller circuitry 185 to, for example, implement a control scheme by which the components and processes on host system 150 interoperate over internal bus 175. Processor/controller circuitry 185 may also perform application and data processing and network protocol processing. Thus, while processor/controller circuitry is illustrated in FIG. 1 as a single component, it may be constructed from several circuits having respective capabilities for performing a particular set of tasks.

Host system 150 may include local memory circuitry 165, which may include electrical, optical and/or magnetic storage media, to store data and processor instructions as needed. Local memory 165 may include persistent data storage memory, persistent processor instruction memory, volatile process memory, volatile context state memory, instruction and/or data cache memory, pipeline memory, etc. Host system 150 may include other circuits, such as dedicated purpose circuitry 170, to perform specific functions, such as user input/output and signal processing.

Network adapter 110 may afford combined access by host system 150 to one or more dedicated networks, such as a storage area network, and a general purpose network, such as the Internet. As such, network node 100 may be viewed as communicating over a number of diverse buses 105a-105n, representatively referred to herein as bus(es) 105, including, but not limited to, buses compliant with small computer systems interface (SCSI), Fiber Channel, external serial AT attachment (eSATA), Ethernet, Internet SCSI (iSCSI), and Ethernet over Fiber Channel. It is to be understood, however, that the present technique is limited neither any particular bus nor to a requirement that the bus be part of a dedicated or general network. Regardless of bus type, network adapter 110 includes a physical network interface unit or circuitry 115 suitable for carrying out communications in accordance with the appropriate standards and protocols. In certain embodiments, network interface circuitry 115 may implement more than one terminal on any bus for which it is configured, such as by incorporating circuitry associated with separate and distinct media access control (MAC) addresses.

In similar fashion to host system 150, network adapter 110 generically includes processor/controller circuitry 120 to control components and processes through internal bus 125 as well as to perform, among other things, network processing, as will be described below. Network adapter 110 may include local memory circuitry 135 to store data and processor instructions, and dedicated purpose circuitry 140 to perform specific functions not implemented by processes executing on processor controller circuitry 120. And, while network adapter 110 may be conceptually similar in architecture to host system 150, such is solely for purposes of basic illustration and concise explanation. The skilled artisan will recognize and appreciate that the two components, i.e., network adapter 110 and host system 150, may be vastly different in both architecture and processing capability, and that network adapter 110 may be more specialized than host system 150.

As indicated above, the disclosed technique is not limited to particular end-functionality of host system 150. However, for purposes of description, it will be assumed that host system 150 implements a network accessible function carried out by network accessible function circuitry 180. Network accessible function circuitry 180 may be, for example, a storage device or a processor executing a data-generating process, but, again, the end functionality is not essential. Network accessible function circuitry 180 serves as an example of host functionality that is tied to the network traffic through node 100. That is, if it is determined by network adapter 110 that traffic is not expected to traverse node 100 for an interval of time, as will be explained further below, energy consumption in network accessible function circuitry 180 can be reduced during that interval.

In the example embodiment of network node 100, both network adapter 110 and host system 150 include power management interface circuitry 130 and 160, respectively, that provide access to power management functions that realize a power management scheme. Each of network adapter 110 and host system 150 may implement a different power management scheme; however, for purposes of explanation, it will be assumed that the power management schemes conform to identical standards, which will be exemplified by a generic power management scheme in the paragraphs that follow.

As used herein, a power management scheme implements power reduction mechanisms that reduce the energy consumption in a device, such as network node 100, when the device is in certain system states, such as during periods of inactivity. Typically, the power savings are achieved by removing power from unused circuitry and/or by suspending or terminating processes that may be executing on a processor in the device. The manner in which components and processes are shut down are defined in the power management scheme by a collection of power states, which may include global power states that establish the power level of the system as a whole, device power states that establish device-dependent control over energy usage of specific components, processor power states that establish control over executing processes on a processor, and performance states that establish control over resources, such as clock speed, that may be activated to reduce energy consumption under certain conditions, such as when the system is operating under battery power. The power states in each of these sets are ordered such that power reduction is greater at deeper power states than for shallower states, but time to recover to a fully powered state is less at shallower states than at deeper states. A power management scheme may transition various subsystems between power states in any of the global, device, processor and performance sets of power states, based on state transition criteria defining the overall power management scheme. The state transition criteria will be referred to herein as forming a power management schedule. The power management schedules for network adapter 110 and host system 150 may be stored as one or more tables in local memories 135 and 165, respectively, and may be accessed by power management interface circuitry 130 and 160, respectively, to place network node 100 in a particular power state. Alternatively, power management interface circuitry 130 and 160 may realize a power management schedule through logic circuitry that distributes power control signals that set the power state in various circuits. The power state of network node 100 is defined by the combination of all power states across all components and processes of network adapter 110 and host system 150. The deepest diminished power state is that which conserves the greatest energy across the network adapter 110 and the host 150, even when the energy savings are redeemed entirely in only one or the other component.

Figure 2:
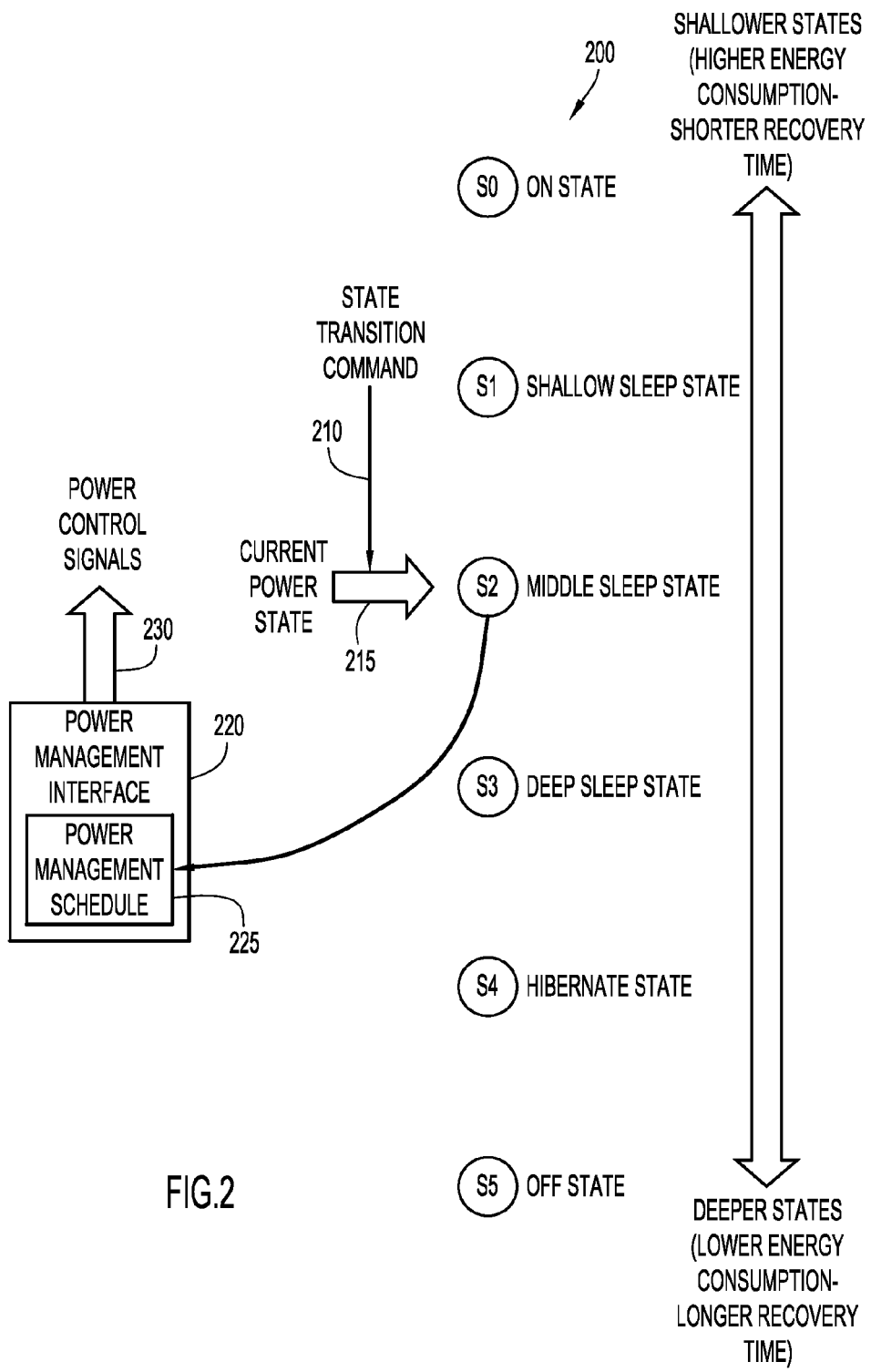
FIG. 2 is a conceptual diagram of a power management scheme that may be used in conjunction with the disclosed technique.

While the disclosed concept is not limited to a particular power management scheme, a simple power management scheme 200 is illustrated in FIG. 2 and described with reference to a "system," which may be the entire network node 100, either of network adapter 110 or host system 150, or circuits and subsystems therein. As illustrated in FIG. 2, the example power management scheme 200 defines six (6) power states ranging from power state S0, in which the system is under full power and is fully operational, to power state S5, in which system power is completely removed. Power states S1-S4 are diminished power states, alternatively referred to as sleep states, in which the system operates under levels of diminished operational capacity to meet an energy consumption threshold. As illustrated in FIG. 2, the power states S0-S5 are ordered such that shallower states correspond to higher energy consumption but shorter recovery time, while deeper power states correspond to lower energy consumption but longer recovery time. Power state S0 defines an ON state, in which, as indicated above, the system is under full power and is fully operational. Pipeline and cache memory are fully utilized and process contexts are updated by the system processor. Power state S1 defines a shallow sleep state, in which the system consumes less energy than S0 state. In the shallow sleep state, the processor may suspend the execution of processes, but all hardware and processor contexts are maintained. Certain dedicated function circuitry may be powered-down, such as a computer display. Power state S2 defines a middle sleep state, in which the system consumes less energy than the S1 state. In the middle sleep state, processes executing on a system processor are terminated and power is removed from the processor. The contents of cache memory are flushed to volatile system memory for which power is maintained. Power state S3 defines a deep sleep state, in which the system consumes less energy than the S2 state. In the deep sleep state, all state information for the processor and other hardware is lost. Power to system memory is maintained, but only at a level sufficient to retain its contents. Power state S4 defines a hibernation state, in which the system consumes the least power with the exception power state S5. The contents of the volatile system memory are written to persistent memory and power is removed from the volatile system memory. Power state S5 defines an OFF state, in which the system is entirely shutdown, with the possible exception of certain indicators. In power state S4, operations can resume by reloading the system memory contents into volatile system memory from persistent storage, and restoring the processor context. In power state S5, however, the system must be rebooted.

A system under power management scheme 200 may transition from a previous power state to a current power state 215 in response to a suitable state transition command signal 210. In certain embodiments, the transition between states occurs linearly from shallower power states to deeper power states in response to increasingly longer periods of inactivity in the system. When activity resumes, state transition command signal 210 may compel a transition from current power state 215 directly to power state S0. In other embodiments, state transition command signal 210 may compel a power state transition from ON state S0 directly to current power state 215 without transitioning through any of the intervening shallower power states. As before, when activity resumes, state transition command signal 210 compels a power state transition from the current state 215 directly to the ON state.

In response to a state transition, power management interface 220 may generate one or more power control signals 230 to power down any of the circuits and/or suspend or terminate any executing processes indicated in power management schedule 225 for the corresponding power state. It is to be understood that FIG. 2 is a conceptual diagram; numerous techniques can be implemented to associate a power state with system components from which to remove at least partial power, as well as to implement mechanisms that remove the power from the components or suspend certain activity. The scope of the present concept is intended to encompass such implementations.

Power management scheme 200 may take into consideration factors of efficiency. For example, while the power is reduced for deeper power states, this power reduction comes at the cost of not only longer recovery time, but also of the energy required for the power state transition back to the ON state. Thus, power management scheme 200 may incorporate state transition criteria in power management schedule 225 that compels a shallower sleep state for intervals of inactivity that occur at high frequency, even when sufficient time for a deeper sleep state is indicated. That is, in certain high frequency state transition scenarios, the system could consume more energy in the repeated transitions to the ON state from a deeper sleep state than would be conserved during the brief resting periods. Other such considerations may be implemented in a power management scheme, and such may be evaluated from empirical data and/or from system modeling.

Figure 3:
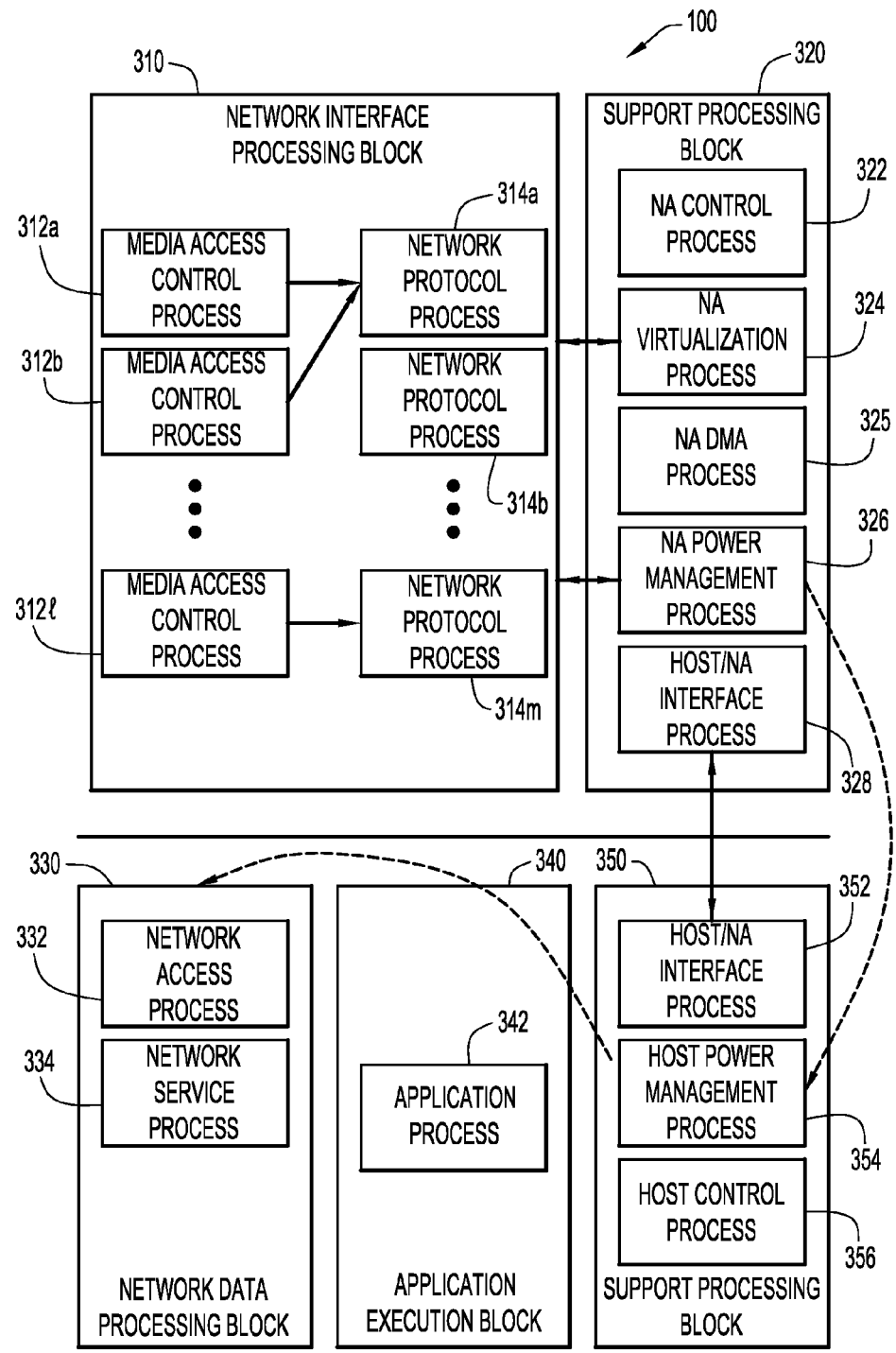
FIG. 3 is a functional block diagram of the network node illustrated in FIG. 1.

FIG. 3 is a functional block diagram of network node 100 illustrated in FIG. 1. In FIG. 3, network node 100 is illustrated by way of example functional blocks each operating on a corresponding processing domain. As used herein, a processing domain defines hardware resources, such as by way of the circuitry illustrated in FIG. 1, on which logic can be implemented, either by the hardware itself or by a combination of the hardware and software, and that can be managed independently in power scheme 200 with respect to other processing domains. As illustrated in FIG. 3, the example processing domains of network node 100 are implemented by network interface processing block 310, support processing blocks 320 and 350, application execution block 340 and network data processing block 330.

Network interface processing block 310 implements the network interface logic to carry out all network communication functions for network node 100. Network interface processing block 310 may execute one or more media access control processes 312a-312l, representatively referred to herein as media access control process(es) 312, and network protocol processes 314a-314m, representatively referred to herein as network protocol process(es) 314. Each media access control process 312 may convert the electromagnetic signal in the corresponding medium to datagrams compliant with a network communication protocol, e.g., Transmission Control Protocol/Internet Protocol (TCP/IP) packets. The datagrams may be forwarded to a corresponding network protocol process 314 to perform the appropriate protocol related functions on the datagrams, e.g., path determination and logical addressing, end-to-end transport, reliability and flow control, inter-host communication session management, encryption and decryption and delivery of application data. Network interface processing block 310 may be configured to extract datagrams from multiple different network media through respective media access control processes 312 and subsequently perform the network processing of the protocol indicated in the datagram by a corresponding network protocol process 314.

Support processing block 320 implements the logic for network adapter control process 322, by which interoperability between component and processes of network adapter 110 is maintained, network adapter direct memory access (DMA) process 324, by which data to and from external storage (not illustrated) can be transferred independently of other resources, and host/network adapter interface process 328, by which information-bearing data and control signals are conveyed to and from host network adapter process 352 in support processing block 350. Support processing block 320 additionally implements logic for network adapter virtualization process 324, which is described below with reference to FIG. 4, and network adapter power management process 326 that realizes the network adapter's power management scheme, such as power management scheme 200 illustrated in FIG. 2.

Support processing block 350 implements the logic for host/network adapter interface process 352, which, as indicated above, conveys information-bearing data and control signals to and from host/network adapter process 328, as well as host control process 356, by which interoperability between component and processes of host system 150 is maintained. Support processing block 350 additionally implements logic for host power management process 354, by which the operations of the host system's power management scheme are conducted. Power management process 354 may realize a power management scheme that is identical, similar or substantially different from the power management scheme implemented by network adapter power management process 326.

Application execution block 340 implements the logic for one or more applications 342, which may be a software application running on host system 150, and may be either isolated from the attached network(s), i.e., independent of network communications, or an application to which and from which application layer data are conveyed over the attached buses 105.

Network data processing block 330 implements the logic for various network dependent processes. For example, network access process 332 may establish communications sessions over one or more of attached buses 105 and network service process 334 may realize a network accessible function, such as those described above. The skilled artisan will recognize other such network dependent functions that may be used in conjunction with the present technique.

In certain embodiments of the present concept, network traffic characteristics that are determined in the normal course of network protocol processing are analyzed, as described below, and network adapter 110 is transitioned into an appropriate power state based on those characteristics. In one power management scheme, network interface processing block 310 is operable into the power states described with reference to FIG. 2 and, power management process 326 may receive an indication as to which power state network interface processing block 310 is to be transitioned. Power management process 326 may assert the appropriate signals to compel network interface processing block 310 into the indicated power state. In certain embodiments, power management process 326 may forward the power state information to power management process 354, such as over interface bus 107, where it may be translated, if necessary, into the power management scheme of host system 150. Power management process 354 may apply additional energy saving measures based on the knowledge that an interval of inactivity in the network traffic is imminent, such as to transition network data processing block 330 into an appropriate diminished power state.

It is to be understood that subdivisions of processing domains in network node 100 that are greater than that illustrated in FIG. 3 may be implemented and, when so embodied, finer granularity of control over power states may be realized. The skilled artisan will readily recognize such variants upon review of this disclosure and will recognize as well that such variants can be embodied without deviating from the spirit and intended scope of the present concept.

Figure 4:
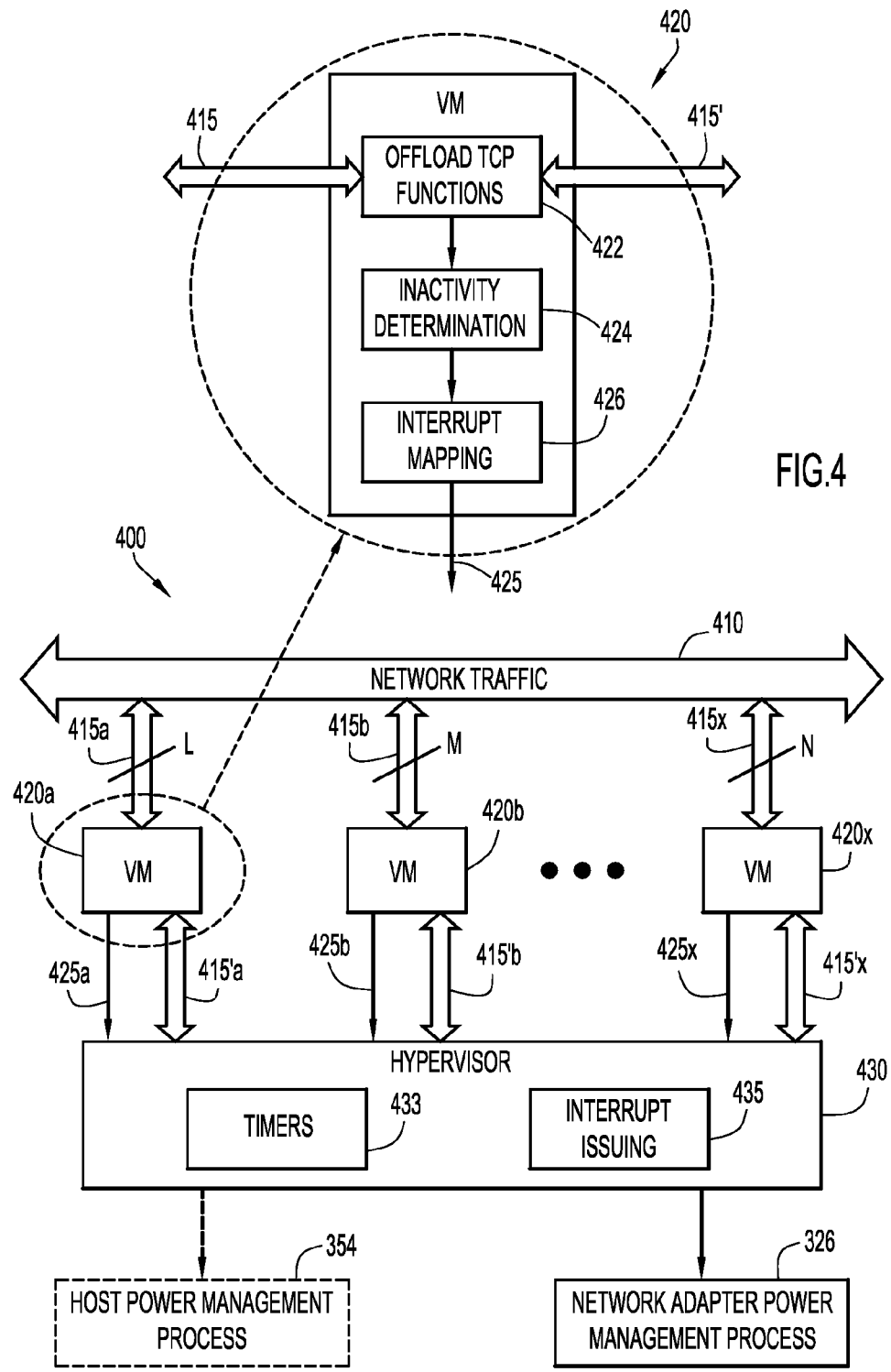
FIG. 4 is functional block diagram of a network processing virtualization that can be used in conjunction with the technique described herein.

As stated above, support processing block 320 may implement the logic for network adapter virtualization process 324. An example network adapter virtualization 400 is illustrated in FIG. 4, under which a plurality of virtual machines (VMs) 420*a*-420*x*, representatively referred to herein as VM(s) 420, perform a subset of network processing functions on resources that are independent of network interface processing block 340, referred to herein as protocol offloading. Indeed, in certain embodiments, virtualization process 324 is implemented in its own processing domain by dedicated circuitry that performs the virtualization with high efficiency.

In virtualization 400, VMs 420 perform various TCP related tasks, representatively illustrated as offloaded TCP functions 422, on a corresponding set of flows 415*a*-415*x*, representatively referred to herein as flow set(s) 415, carried in network traffic 410. In one embodiment, offloaded TCP functions 422 include flow control mechanisms by which the transport of the flows under its control is adjusted for given network traffic conditions. In the normal course of flow control, each VM determines the round-trip-time (RTT) for packets in its flows, such as through the timing of acknowledgment (ACK) packets received in response to previously transmitted packets. Thus, this metric is readily available without any additional processing cost and can be used by the VMs 420 to determine intervals of inactivity in the network traffic traversing network node 100, as illustrated by inactivity determining process 424. From the inactivity determination, each VM 420 may issue a soft interrupt 425*a*-425*x* (i.e., an interrupt issued under software control), representatively referred to herein as soft interrupt(s) 425, to hypervisor 430.

Figure 5:
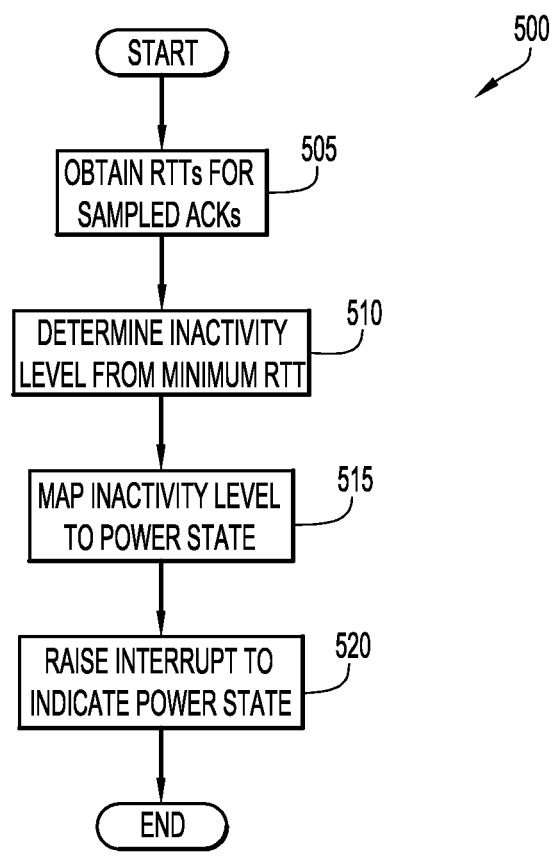
FIG. 5 is a flow diagram of an example traffic characteristics analysis that can be performed in conjunction with the virtualization illustrated in FIG. 4.

FIG. 5 is a flow diagram of an example VM process 500 by which intervals of traffic inactivity are assessed in each VM 420 and corresponding soft interrupts 425 are raised. In operation 505, the VM 420 obtains the RTTs for selected ACK packets sampled from the flows under its control. The minimum of the RTTs is selected as the longest interval of inactivity, but, in certain embodiments, adjustments may be made to compensate for certain assumptions about the nature of the network traffic and the resources at the node, such as the size of packet buffers, to process network traffic in a particular time frame. In operation 515, the inactivity interval is mapped to a particular power state, which, in certain embodiments, is the deepest power state from which timely recovery to the ON state is assured so that subsequently arriving packets can be accepted without packet loss. The mapping can be based on traffic models and/or empirical data and stored in memory for use by interrupt mapping process 426. In operation 520, a soft interrupt is issued to hypervisor 430 that indicates the mapped power state.

Hypervisor 430 serves as a VM manager for VMs 420 and may have additional functionality, such as implementation of a virtual bus (not illustrated) over which VMs 420 can route various of their flows, representatively illustrated at flows 415'*a*-415'*x* and representatively referred to herein as flows 415', between one another. Additionally, hypervisor 430 processes the soft interrupts 425 across all VMs 420, such as by interrupt issuing process 435, and issues a single interrupt to network adapter power management process 326 and, optionally, to host power management process 354. Hypervisor 430 may also implement one or more timers 433 to track various intervals of time.

Figure 6:
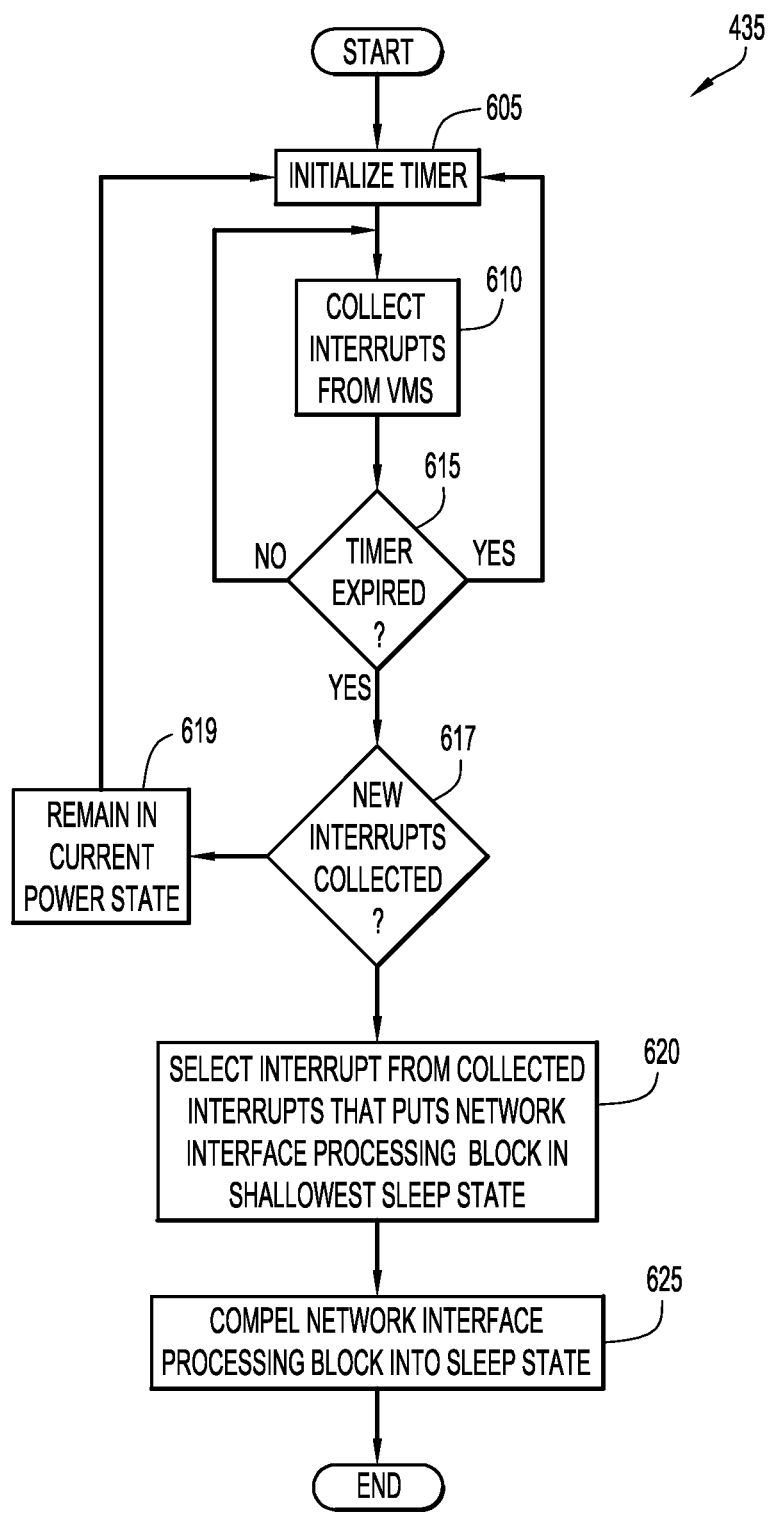
FIG. 6 is a flow diagram of an example power state interrupt-generating process that can be performed in conjunction with the analysis illustrated in FIG. 5.

FIG. 6 is a flow diagram of an example hypervisor process 435 by which a power state interrupt is raised. In operation 605, a timer is initialized to time a sampling interval and in operation 610, the soft interrupts across all VMs 420 are collected over the sampling interval. When the timer expires, as determined in operation 615, the timer is reinitialized for another sampling period. In operation 617, it is determined whether any interrupts were collected during the most recently expired time interval. If no, the current power state is maintained, as illustrated at process block 618. Otherwise, in operation 620, the most recently collected soft interrupts are analyzed and an interrupt is selected from all the collected soft interrupts that corresponds to the shallowest power state indicated by the software interrupts. That is, VMs 420 issue respective interrupts that indicate the deepest power state from which recovery can be timely obtained, and hypervisor 430 selects the shallowest of those power states. In operation 625, the interrupt selected by hypervisor 430 is issued to power management process 326, and the power state is compelled in accordance with the appropriate power management scheme, as described above with reference to FIG. 2.

In certain embodiments, hypervisor 430 may initialize a timer in accordance with the issued interrupt that, upon expiration, signals power management process 326 to return to the fully operational state. For example, hypervisor 430 may have access to the amount of time required to return to the fully operational state from all other power states. A timer may be initialized with the time for which network traffic is expected to resume minus the recovery time from the diminished power state corresponding to the interrupt issued by the hypervisor 430 to the fully operational power state. Upon expiration of the timer, power management process 326 is signaled and, in response, compels network node 100 to return to the fully operational state. Accordingly, when so embodied, the system is in the fully operational state prior to, or coincident with, the resumption of network traffic at network node 100.

As discussed above, memory circuits 135 and 165 may comprise one or more storage types, including read only memory (ROM), random access memory (RAM), magnetic disk storage media devices, optical storage media devices, flash memory devices, electrical, optical, or other physical/tangible memory storage devices. Processor/controller circuits 120 and 185 may include, for example, a microprocessor or microcontroller that executes instructions for the network interface processing logic 310, support processing blocks 320 and 350, application execution block 340 and network data processing block 330. Thus, in general, the memory circuits 135 and 165 may comprise one or more tangible computer readable storage media (e.g., a memory device) encoded with software comprising computer executable instructions and when the software is executed (by the processor/control circuits 120 and 185), the processors are operable to perform the operations described herein in connection with any or all of the processes carried out in network interface processing logic 310, support processing blocks 320 and 350, application execution block 340 and network data processing block 330.

The above description is intended by way of example only.

What is claimed is:

1. A method comprising:
   determining temporal intervals of inactivity in network traffic traversing a network node from transport control data carried in the network traffic;
   generating an interrupt that compels a deepest diminished power state from a plurality of power states in the network node from which recovery to a completely powered state within a minimum one of the inactivity intervals is assured; and
   reducing electrical energy consumption in the network node responsive to the interrupt in accordance with a predetermined power management schedule.

2. The method of claim 1, further comprising:
   collecting the traffic control data from respective sets of flows of the network traffic;
   determining the intervals of inactivity across all flows in the respective flow sets from the collected traffic control data; and
   generating the interrupt that compels the diminished power state from which recovery within the minimum one of the intervals across the sets of flows is assured.

3. The method of claim 2, further comprising:
   generating soft interrupts for the respective flow sets that indicate the respective deepest diminished power states in the network node from which recovery within the respective minimum intervals of inactivity are assured; and
   generating the interrupt that compels a shallowest one of the diminished power states in the network node from among the deepest diminished power states indicated by the soft interrupts.

4. The method of claim 3, wherein determining the intervals of inactivity comprises:
   determining round-trip-times (RTTs) for packets in the flows of the respective flow sets from the traffic control data; and
   estimating the minimum intervals of activity for each of the flow sets from the minimum RTT across the flows in the respective flow sets.

5. The method of claim 4, further comprising:
   instantiating virtual machines to control the flows in the respective flow sets in accordance with the traffic control data, each of the virtual machines computing the RTTs for the flows in the corresponding flow set as a function of controlling the flows;
   sampling by the virtual machines the RTTs in the flows of the respective flow sets;
   estimating the minimum intervals of inactivity from the minimum sampled RTTs; and
   generating the soft interrupts to indicate the respective deepest diminished power states in the network node from which recovery within the respective estimated minimum intervals of inactivity are assured.

6. The method of claim 5, wherein generating the interrupt that compels the shallowest diminished power state comprises:
   collecting the soft interrupts from the virtual machines over a predetermined time period; and
   determining the shallowest one of the power states across the deepest diminished power states indicated by the soft interrupts over the time period.

7. The method of claim 5, wherein determining the RTTs comprises determining the RTTs from acknowledgment packets received at the virtual machines in response to sending the packets in the flows.

8. The method of claim 1, wherein generating the interrupt comprises generating the interrupt to be recognized by power management circuitry of a network adapter of the network node.

9. The method of claim 8, wherein generating the interrupt further comprises generating the interrupt to be additionally recognized by power management circuitry of a host processor connected to the network adapter where the reduction in energy consumption is a combination of energy reduction in the network adapter and the host processor in response to the interrupt.

10. An apparatus comprising:
    a network interface unit to receive and transmit network traffic; and
    a processor coupled to the network interface unit, and configured to:
    determine temporal intervals of inactivity in the network traffic from transport control data carried in the network traffic;

generate an interrupt that compels a deepest diminished power state from a plurality of power states from which recovery to a completely powered state within a minimum one of the inactivity intervals is assured; and reduce electrical energy consumption responsive to the interrupt in accordance with a predetermined power management schedule.

11. The apparatus of claim 10, wherein the processor is further configured to:

collect the traffic control data from respective sets of flows of the network traffic;

determine the intervals of inactivity across all flows in the respective flow sets from the collected traffic control data; and generate the interrupt that compels the diminished power state from which recovery within the minimum one of the intervals across the sets of flows is assured.

12. The apparatus of claim 11, wherein the processor is further configured to:

generate soft interrupts for the respective flow sets that indicate the respective deepest diminished power states from which recovery within the respective minimum intervals of inactivity are assured; and generate the interrupt that compels a shallowest one of the diminished power states from among the deepest diminished power states indicated by the soft interrupts.

13. The apparatus of claim 12, wherein the processor is further configured to:

determine round-trip-times (RTTs) for packets in the flows of the respective flow sets from the traffic control data; and estimate the minimum intervals of activity for each of the flow sets from the minimum RTT across the flows in the respective flow sets.

14. The apparatus of claim 13, wherein the processor is further configured to:

instantiate virtual machines to control the flows in the respective flow sets in accordance with the traffic control data, each of the virtual machines computing the RTTs for the flows in the corresponding flow set as a function of controlling the flows;

sample by the virtual machines the RTTs in the flows of the respective flow sets;

estimate the minimum intervals of inactivity from the minimum sampled RTTs; and generate the soft interrupts to indicate the respective deepest diminished power states in the network node from which recovery within the respective estimated minimum intervals of inactivity are assured.

15. The apparatus of claim 14, wherein the processor is further configured to:

collect the soft interrupts from the virtual machines over a predetermined time period; and determine the shallowest one of the power states across the deepest diminished power states indicated by the soft interrupts over the time period.

16. The apparatus of claim 14, wherein the processor is further configured to determine the RTTs from acknowledgment packets received at the virtual machines in response to sending the packets in the flows.

17. A tangible, non-transient computer-readable storage medium having processor instructions encoded thereon that, when executed by a processor, configures the processor to:

determine temporal intervals of inactivity in network traffic traversing a network node from transport control data carried in the network traffic;

generate an interrupt that compels a deepest diminished power state from a plurality of power states in the network node from which recovery to a completely powered state within a minimum one of the inactivity intervals is assured; and reduce electrical energy consumption in the network node responsive to the interrupt in accordance with a predetermined power management schedule.

18. The computer-readable storage medium of claim 17, and having processor instructions encoded thereon that, when executed by the processor, configures the processor to:

collect the traffic control data from respective sets of flows of the network traffic;

determine the intervals of inactivity across all flows in the respective flow sets from the collected traffic control data; and generate the interrupt that compels the diminished power state from which recovery within the minimum one of the intervals across the sets of flows is assured.

19. The computer-readable storage medium of claim 18, and having processor instructions encoded thereon that, when executed by the processor, configures the processor to:

generate soft interrupts for the respective flow sets that indicate the respective deepest diminished power states in the network node from which recovery within the respective minimum intervals of inactivity are assured; and generate the interrupt that compels a shallowest one of the diminished power states in the network node from among the deepest diminished power states indicated by the soft interrupts.

20. The computer-readable storage medium of claim 19, and having processor instructions encoded thereon that, when executed by the processor, configures the processor to:

determine round-trip-times (RTTs) for packets in the flows of the respective flow sets from the traffic control data; and estimate the minimum intervals of activity for each of the flow sets from the minimum RTT across the flows in the respective flow sets.

21. The computer-readable storage medium of claim 20, and having processor instructions encoded thereon that, when executed by the processor, configures the processor to:

instantiate virtual machines to control the flows in the respective flow sets in accordance with the traffic control data, each of the virtual machines computing the RTTs for the flows in the corresponding flow set as a function of controlling the flows;

sample by the virtual machines the RTTs in the flows of the respective flow sets;

estimate the minimum intervals of inactivity from the minimum sampled RTTs; and generate the soft interrupts to indicate the respective deepest diminished power states in the network node from which recovery within the respective estimated minimum intervals of inactivity are assured.

22. The computer-readable storage medium of claim 21, and having processor instructions encoded thereon that, when executed by the processor, configures the processor to:

collect the soft interrupts from the virtual machines over a predetermined time period; and determine the shallowest one of the power states across the deepest diminished power states indicated by the soft interrupts over the time period.

\* \* \* \* \*